No. 768,170. PATENTED AUG. 23, 1904.
J. DORSETT.
SOIL PULVERIZER.
APPLICATION FILED MAY 28, 1904.
NO MODEL.
Fig. 1.
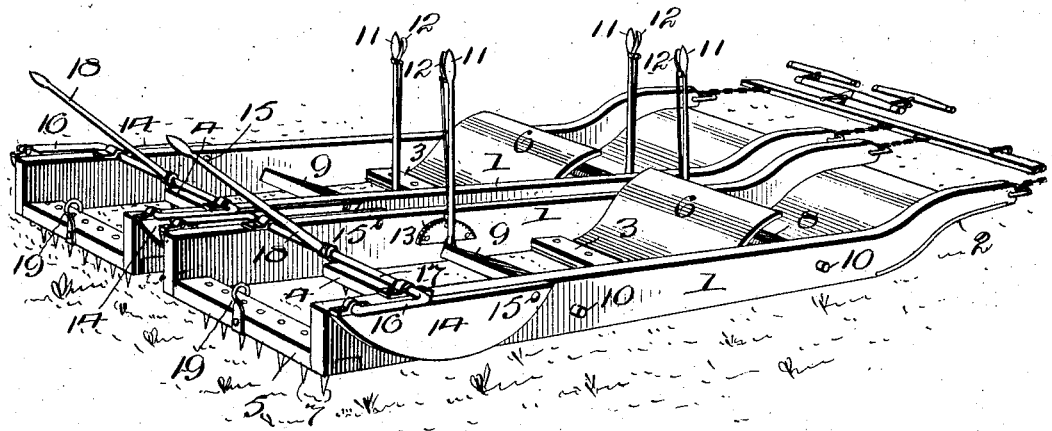
Fig. 2.
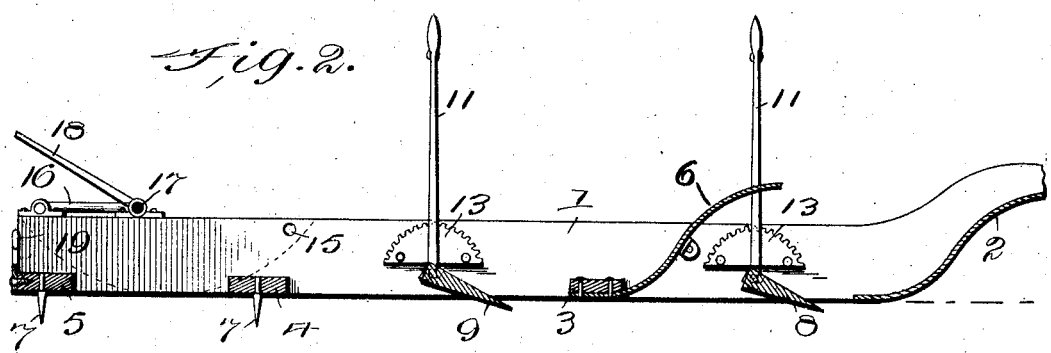
Fig. 3.
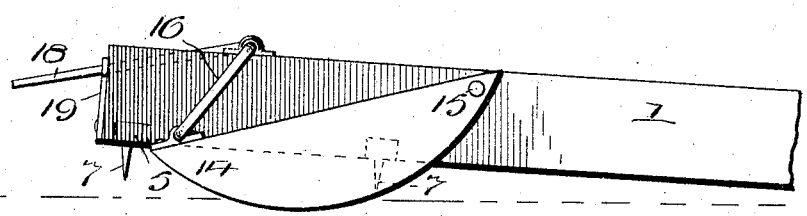
Fig. 4.
Witnesses
F. C. Barry.
G. Gould.
Inventor
Josiah Dorsett.
By W. J. FitzGerald
Attorneys No. 768,170.

Patented August 23, 1904.

UNITED STATES PATENT OFFICE.

JOSIAH DORSETT, OF CHRISMAN, ILLINOIS.

SOIL-PULVERIZER.

SPECIFICATION forming part of Letters Patent No. 768,170, dated August 23, 1904.

Application filed May 28, 1904. Serial No. 210,237. (No model.)

*To all whom it may concern:*

Be it known that I, JOSIAH DORSETT, a citizen of the United States, residing at Chrisman, in the county of Edgar and State of Illinois, have invented certain new and useful Improvements in Soil-Pulverizers; and I do hereby declare the following to be a full, clear, and exact description of the invention, such as will enable others skilled in the art to which it appertains to make and use the same.

My invention relates to soil-pulverizers; and it consists of certain novel features of construction and combination of parts, the preferred form whereof will be hereinafter clearly set forth, and pointed out in the claim.

The prime object of my invention is to provide reliably-efficient means for thoroughly loosening and pulverizing the surface of the soil, whereby it will be fitted as a perfect seed-bed for the reception of wheat, corn, or, in fact, any crop which it is desired shall be produced.

A further object of my invention, among others, is to provide simple and efficient means for not only loosening the surface of the soil, but to insure the disintegration or pulverization of clods, lumps of sod, and the like.

Other objects and advantages will be made clearly apparent from the foregoing specification considered in connection with the accompanying drawings, which are made a part of this application, and in which—

Figure 1 shows a perspective view of my invention complete ready for use. Fig. 2 shows a longitudinal sectional view of Fig. 1. Fig. 3 shows a side elevation of the rear end of my pulverizing-machine as slightly elevated by means of an attachment which I have provided. Fig. 4 is a perspective view showing one of the pulverizing-blades employed by me for loosening the surface of the soil.

For convenience of reference to the various details and coöperating accessories of my invention numerals will be employed, the same numeral applying to a similar part throughout the several views.

Referring to the numerals on the drawings, 1 designates a plurality of carrying runners or members, which latter are properly secured together at their forward ends by means of the upwardly-directed curved plate 2, said plate being for the purpose of readily passing over inequalities in the surface and also over clods and lumps of sod, which latter will be thoroughly mashed and disintegrated by the pressure of said plate. It will be observed that I have also provided at intervals throughout the length of the runners or supporting members 1 a plurality of cross-bars 3, 4, and 5, the first-mentioned cross-bar having attached to its under side the rear edge of a clod-crushing plate 6, there being preferably two of said plates, though it will be understood that any desired number of runner members 1 and coöperating parts may be provided, thus insuring that the machine may be built of any preferred width.

The cross-bars 4 and 5 are provided with a plurality of harrow-teeth 7 of the usual or any preferred construction, the obvious purpose of said teeth being to thoroughly disintegrate and pulverize the surface of the soil as the machine is drawn over the same.

By reference to Fig. 2 it will also be seen that I have provided a plurality of surface-cutting blades or knives 8 and 9, the latter indicating the rear blades. Each of the blades is provided with a trunnion 10 at each end, said trunnion being designed to be received by an aperture in the runner member 1, and in order that the blades may be adjustably secured relative to the surface of the soil, whereby they will take deeply or lightly into the same, I provide the controlling-levers 11, each having a thumb-lever 12, which is designed to control a detent coöperating with the segmental rack-bar 13, the latter being attached at a convenient point upon one of the runner members 1, and it therefore follows that by a proper manipulation of the controlling-lever 11 the blade or knife 8 may be caused to take very deeply or lightly into the soil, as will be productive of the best results.

If it should become desirable to elevate the rear end of the machine, whereby the teeth 7 will be lifted out of engagement with the surface of the soil, I am enabled to accomplish this result by means of the auxiliary runners 14, which are pivoted at their forward ends to each of the runners or members 1, as designated by the numeral 15, while the rear end is left free to be controlled by the crank-arm 16, pivotally attached thereto. The crank-arm 16 is rigidly connected to the rock-shaft 17, which is provided with a controlling-lever 18, and it is obvious that by moving the lever 18 downward and securing it under the hook or keeper 19 the rear ends of the auxiliary runners 14 will be pressed down below the edge of the main runners 1, thereby elevating the main runners and holding the teeth 7 entirely above the surface of the soil. In this position the weight of the machine is thrown almost wholly upon the plates 2 and 6, thus fitting the machine for use as a clod-crusher and a surface-smoother and also enabling the machine to be readily drawn from field to field, as along a roadway, without damage thereto or injury to the road.

The various parts of my invention may be made any desired size and of any preferred material deemed best suitable for the purpose, and, while I have described the preferred combination and construction of parts, I desire to comprehend in this application all substantial equivalents and substitutes which may be considered as falling fairly within the scope and purview of my invention.

Having thus fully described the construction of my invention, it is thought that the operation or manner of using the same will be fully apparent, though it may be stated that the machine is drawn over the ground by suitable draft-animals, and the clods and lumpy soil will be engaged by the plates 2 and 6, and by a proper manipulation of the controlling-lever 11 the cutting-blades 8 and 9 may be thrown deeply or lightly into the surface of the soil, which will insure a complete agitation thereof, part of the soil rising up and passing over the blades incident to the travel of the machine, the action of the blades being followed by the action of the harrow-teeth 7, all of which insures that the surface of the soil will be left in a thoroughly-pulverized condition or in the form of a perfect seed-bed ready for the planting process.

Having thus fully described my invention, what I claim as new, and desire to secure by Letters Patent, is—

The herein-described soil-pulverizing machine comprising a plurality of carrying-runners; upwardly-directed curved plates 2 and 6 carried by said runners and successively acting upon the surface of the ground; a plurality of cutting-blades 8 and 9 and means to adjustably control the position of said blades whereby they will take lightly or deeply into the soil as preferred, in combination with a plurality of teeth-carrying sections 4 and 5 attached to the carrying-runners and a plurality of auxiliary runners and means to control the position thereof whereby the rear end of the machine may be elevated out of engagement with the surface of the soil, all combined substantially as specified and for the purpose set forth.

In testimony whereof I have signed my name to this specification in the presence of two subscribing witnesses.

JOSIAH DORSETT.

Witnesses:
   JAMES M. WILLMAN,
   W. B. GOSNEY.